United States Patent [19]

van den Berg et al.

[11] 3,846,863

[45] Nov. 12, 1974

[54] WINDSHIELD WIPER ASSEMBLY

[75] Inventors: Johan H. van den Berg; Alex H. A. van Eekelen, both of Hasselt, Belgium

[73] Assignee: Monroe Belgium N.V., Sint-Truiden, Belgium

[22] Filed: Nov. 10, 1972

[21] Appl. No.: 305,500

[52] U.S. Cl. ............................................ 15/250.32
[51] Int. Cl. ............................................... B60s 1/40
[58] Field of Search ....... 15/250.32, 250.35, 250.36, 15/250.42

[56] References Cited
UNITED STATES PATENTS
3,082,463  3/1963  Bock et al ........................ 15/250.32
FOREIGN PATENTS OR APPLICATIONS
228,998  7/1960  Australia ......................... 15/250.32
524,074  8/1940  Great Britain ................... 15/250.32

*Primary Examiner*—Peter Feldman
*Attorney, Agent, or Firm*—Harness, Dickey & Pierce

[57] ABSTRACT

A windshield wiper blade connector adapted to detachably secure a windshield wiper blade assembly to an associated wiper arm having a generally flat rectangular cross section end portion defining an attachment area, the connector being of a generally inverted U-shaped configuration and including an end section and a pair of spaced apart side sections adapted to be secured to the blade assembly, the connector defining a cavity adapted to removably receive the end portion of the wiper arm, and means formed integrally of the connector and projecting at least partially into the cavity and cooperable with the area on the wiper arm end portion for releasably retaining the end portion within the cavity and thereby securing the blade assembly to the arm.

6 Claims, 3 Drawing Figures

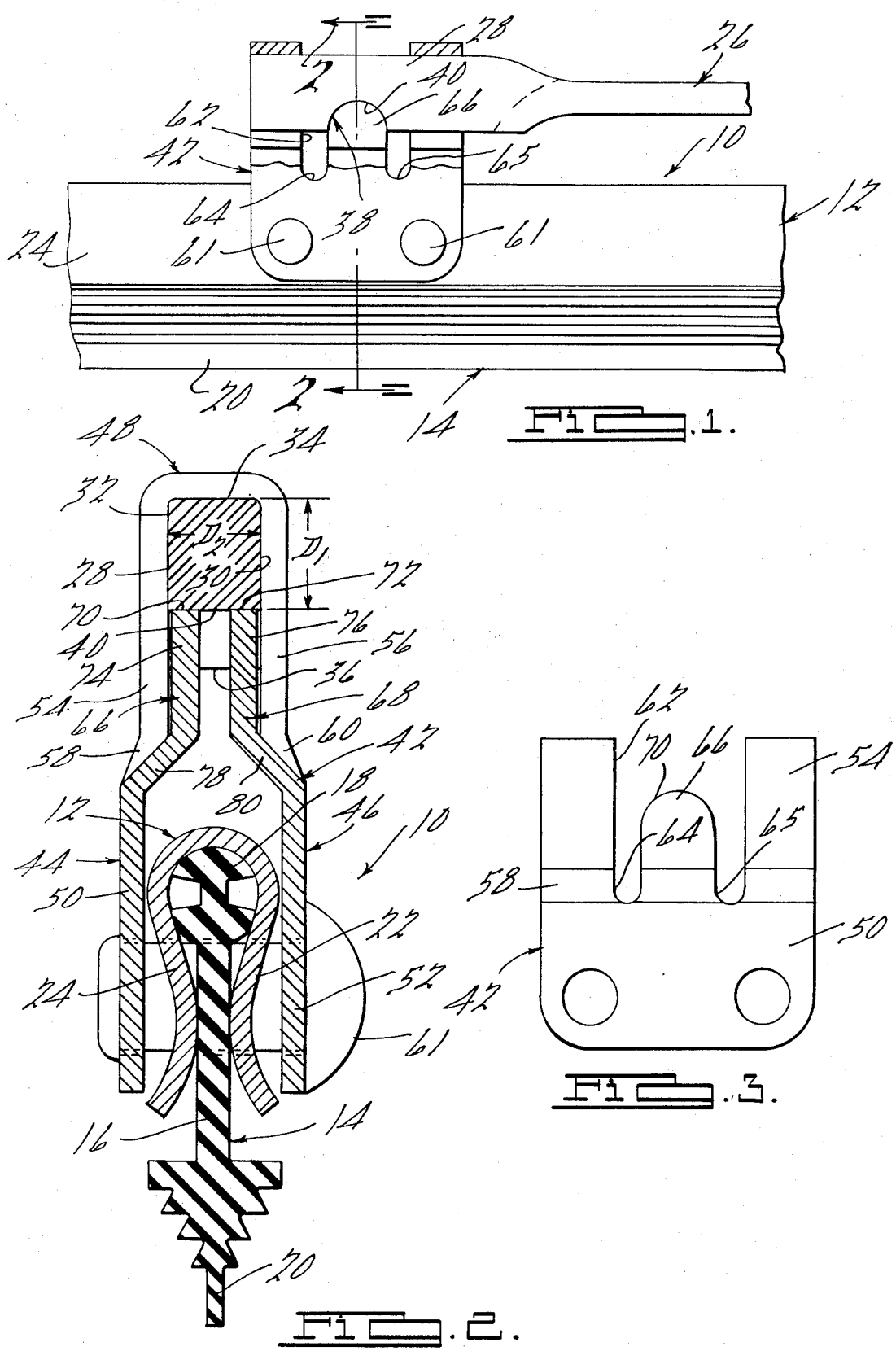

3,846,863

WINDSHIELD WIPER ASSEMBLY

SUMMARY OF THE INVENTION

Various types of connector elements have been used in the prior art for operatively connecting windshield wiper blade assemblies to associated wiper arms. The configuration or geometry of these various elements has, of course, varied from one connector to another in accordance with the size and shape of the associated wiper arm. One type of arm that has been used in the past consists of a generally U-shaped member defining an elongated cavity through which a flat end portion of the associated wiper arm is adapted to extend. The wiper arm end portion is detachably secured within the cavity of the connector, which in itself is fixedly secured to the associated windshield wiper blade by means of a suitable screw or other fastening element. This type of connector element, while being of a relatively simple construction, has been objectionable from the standpoint that both the associated fastening element, i.e., screw or the like, and connector itself which requires a threaded or tapped bore therein for cooperation with the screw, have rendered such connectors relatively expensive. The present invention is directed to a new and improved windshield wiper blade assembly - blade arm connector, of the above described type, which obviates the need for such a fastening member, as well as the associated threaded bore within the connector.

More particularly, the present invention is directed toward a connector which includes means formed integrally thereof adapted for engagement or cooperation with the end portion of the associated arm for positively securing the arm end portion within the aforesaid cavity. The connector is designed so that it may be fabricated by means of a simple stamping operation and without the required manufacturing steps of boring and threading an aperture, as has been necessary in the prior art. Accordingly, the connector of the present invention will be seen to be of an extremely simple and thus economical construction as compared to said prior art devices.

Accordingly, it is a general object of the present invention to provide a new and improved connector for operatively securing windshield wiper blade assemblies to associated wiper arms.

It is a more particular object of the present invention to provide a new and improved connector of the type defining a cavity adapted to removably receive the outer end portion of a wiper arm and which includes means projecting interiorly of the cavity and cooperable with the wiper arm end portion for detachably securing the same within the cavity, which securing means obviates the need for any screws, bolts or similar fastening elements as have been required in the prior art.

It is another object of the present invention to provide a new and improved connector of the above described type that will find universality of application, which is of a simple design and will be economical to manufacture and assemble.

Other objects and advantages of the present invention will become apparent from the following detailed description taken in conjunction with the accompanying drawing.

BRIEF DESCRIPTION OF THE DRAWING

FIG. 1 is a side elevational view, partially broken away, of the connector of the present invention, as shown in operative association with fragmentary portions of a typical windshield wiper blade assembly and associated wiper arm;

FIG. 2 is an enlarged transverse cross sectional view taken substantially along the line 2—2 of FIG. 1; and FIG. 3 is an enlarged side elevational view of characters shown in FIGS. 1 and 2.

DETAILED DESCRIPTION OF A PREFERRED EMBODIMENT

Referring now in detail to the drawing and in particular to FIG. 1 thereof, a windshield wiper blade assembly, generally designated by the numeral 10, is shown as comprising an elongated channel shaped support member 12 and a resilient deformable wiping element 14 which is co-extensive of the support member 12. The wiping element 14 comprises an intermediate body section 16 and an elongated enlarged thickness upper edge portion 18 on the upper side thereof and an elongated wiping lip portion 20 along the opposite or lower edge thereof. As will be appreciated by those skilled in the art, the wiping lip portion 20 of the wiping element 14 is adapted to be moved back and forth or reciprocated along the surface of a vehicle windshield or the like in order to effect removal of moisture accumulated thereon. As best seen in FIG. 2, the blade support member 12 is of a generally U-shaped configuration in transverse section and comprises opposed co-extensive side sections 22 and 24 which define an elongated channel within which the upper edge portion 18 of the wiping element 14 and part of the body section 16 thereof are operatively disposed, whereby the support member 12 will have the lip portion 20 depending downwardly therefrom.

The blade assembly 10 is adapted to be operatively associated with a wiper arm, herein designated by the numeral 26, which is typically mounted for pivotal movement adjacent the surface of a vehicular window or windshield as will be appreciated by those skilled in the art. The wiper arm 26 comprises a generally rectangular cross sectioned outer end portion 28 which is adapted to have the blade assembly 10 detachable secured thereto. Toward this end, the end portion 28 comprises spaced parallel side surfaces 30, 32, a top surface 34 and a bottom surface 36. As illustrated, the bottom surface 36 is formed with an upwardly projecting generally semi-circular notch or recess 38 which defines a semi-cylindrical surface 40.

In accordance with principles of the present invention, the blade assembly 10 is adapted to be operatively secured to the end portion 28 of the wiper arm 26 in a manner such that the blade assembly 10 will reciprocate concommitently with the arm 26. In addition, the blade assembly 10 is secured to the wiper arm 26 in a manner such that the former may be easily replaced when the wiping lip portion 20 of the wiping element 14 becomes worn, damaged or for some other reason requires that a new assembly be installed. The means utilized in the present invention for achieving the detachable connection of the blade assembly 10 to the wiper arm 26 is in the form of a blade connector, generally designated by the numeral 42, which is, as best seen in FIG. 2, of a generally inverted U-shaped configuration and comprised spaced side sections 44 and 46 which are connected to one another by means of an integral upper or top section 48 that is disposed at generally right angles or perpendicular to the side sections 44, 46. The side sections 44, 46 comprise lower side portions 50 and 52 and upper side portions 54 and 56, respectively. The lower side portion 50, 52 are spaced slightly further away from one another than the upper portions 54, 56, with the result that the upper portions 54, 56 are connected to the lower portions 50, 52 by means of upwardly and inwardly tapered intermediate side portions 58 and 60, respectively. The blade connector 42 is adapted to be operatively secured to the blade support member 12 by having the lower side portions 50, 52 depend downwardly along the opposite sides of the side sections 22, 24 of the member 12 at a position generally intermediate the longitudinally opposite ends thereof. Means in a form of a suitable rivet, screw, bolt or similar fastening element, herein generally designated by the numeral 61, is then inserted through suitable aligned openings or bores in the lower side portions 50, 52 and the side sections 22, 24 of the connector 42 and support member 12, respectively. As shown, more than one of such fastening means 61 may be utilized, where desired.

The upper side of the connector 42 is formed with a downwardly projecting notch, generally designated by the numeral 62, the lowermost portion of which is formed with a pair of further downwardly extending recesses 64 and 65 that in part define a pair of upwardly projecting spring lips 66 and 68 which are integrally connected at their lower ends to the lower side portions 50 and 52 of the connector 42. The upper ends of the spring lips 66, 68 are formed with generally semi-cylindrical or semi-circular surfaces 70 and 72, respectively, which are of a complimentary configuration with respect to the notch 38 and surface 40 formed in the end portion 28 of the wiper arm 26. The uppermost portions of the spring lips 66, 68 are spaced a distance D1 from the underside of the top section 38 of the connector 42, as seen in FIG. 2. The spring lips 66, 68 comprise upper end sections 74 and 76 which are disposed inwardly of the upper side portions 54, 56 of the connector 42, with the lowermost parts of the sections 74, 76 being connected by integral tapered or outwardly and downwardly inclined portions 78 and 80, respectively, to the lower side portions 50, 52 of the connector 42.

It will be seen that the lateral distance between the upper side portions 54, 56 of the connector 42 are spaced a distance D2 which distance is approximately to the lateral thickness of the end portion 28 of the wiper arm 26. Accordingly, at such times as it is desired to effect assembly of a wiper blade assembly 10 on the end portion 28 of the arm 26, the end portion 28 is inserted between the upper side portions 54, 56 to a position wherein the outer end thereof engages the adjacent sides of the spring lips 56, 58. The end portion 28 is thereafter inserted further into the connector 42 until such time as the upper end portions 74, 76 of the spring lips 66, 68 slip into the notch 38 formed on the underside of the end portion 28 of the arm 26. A suitable tool may be used to separate the lips 66, 68 to permit the desired insertion of the end portion 28 therebetween. By virtue of the fact that the upper ends of the spring lips 66, 68 are spaced a distance D1 from the underside of the top section 48 of the connector 42 and due to the fact that this distance is equal to the spacing between the uppermost portion of the notch 38 and the top surface 34 of the end portion 28, and further due to the fact that the lateral width of the end portion 28, i.e., the distance between the side surfaces 30, 32 is approximately equal to the distance D2 defined between the inner sides of the upper side portions 54, 56, the end portion 28 will be positively retained within the connector 42. Once the end portion 28 is properly inserted, the spring lips 66, 68 will assume the position shown in FIG. 2 and will assure against any relative movement between the arm 26 the connector 42 and hence between the blade assembly 10 and the wiper arm 26. At such time as it is desired to effect disassembly of the blade assembly 10 from the wiper arm 26, the spring lips 66, 68 may be biased laterally apart by means of a suitable tool or the like, until such time as the upper ends 74, 76 thereof are spaced laterally away from the end portion 28 of the wiper arm 26, whereby the blade assembly 10 may be easily moved longitudinally off from the outer end 28 of the arm 26.

It will be seen from the foregoing that the present invention provides a novel windshield wiper blade connector which achieves positive detachable attachment of the associated wiper blade and windshield wiper arm without the need for any ancillary screws or similar type fastening elements that require expensive machining operations. In addition, it will be seen that the connector of the present invention, by virtue of its simple design, may be easily manufactured and installed and will find wide universality of application, as well as have a long and effective operational life.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

We claim:

1. A windshield wiper blade connector adapted to detachably secure a windshield wiper blade assembly to an associated wiper arm having a generally flat rectangular cross-section end portion defining a detachment area along one side thereof, said connector being of a generally inverted U-shape configuration and including an end section and a pair of spaced side sections adapted to be secured to the blade assembly, said connector section defining a cavity adapted to removably receive the end portion of the wiper arm, said side sections of said connector include upwardly extending and inwardly projecting spring lips, the uppermost portions of which are spaced downwardly from said top section of said connector a predetermined distance, and wherein said attachment area of said arm includes a recessed portion formed in the underside thereof, the uppermost portion of said recessed area being spaced from the opposite side of said wiper arm end portion a distance approximately equal to said predetermined distance, whereby upon insertion of said wiper arm end portion into said cavity, said end portion is confined between the uppermost portions of said spring lips and the underside of said top section of said connector.

2. The invention as set forth in claim 1 wherein said area on said wiper arm comprises a recessed portion, and wherein said means formed integrally of said connector includes at least one integral spring lip adapted to be nestingly received within said recessed area.

3. The invention as set forth in claim 2 which includes a pair of spring lips formed on the side sections of said connector and adapted to be nestingly received within said recessed portion on said wiper arm.

4. The invention as set forth in claim 1 wherein said side sections have lower end portions adapted to surmount and lie along the opposite sides of said associated wiper blade assembly.

5. The invention as set forth in claim 1 wherein said cavity extends longitudinally of said connector and has a lateral width approximately equal to the lateral width of said wiper arm end portion.

6. The invention as set forth in claim 1 wherein said side sections of said connector comprise upper and lower portions, and wherein said upper portions are spaced closer together than said lower portions, and which includes tapered portions extending between and connecting said upper and lower portions, and wherein said spring lips extend generally parallel to said side sections and are spaced closer together than said upper portions of said side sections.

* * * * *